(12) United States Patent
Yamamoto et al.

(10) Patent No.: US 10,733,679 B2
(45) Date of Patent: Aug. 4, 2020

(54) ALONENESS ESTIMATION DEVICE

(71) Applicant: NTT DOCOMO, INC., Chiyoda-ku (JP)

(72) Inventors: Naoki Yamamoto, Chiyoda-ku (JP); Keiichi Ochiai, Chiyoda-ku (JP); Akiya Inagaki, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 16/338,562

(22) PCT Filed: Apr. 20, 2018

(86) PCT No.: PCT/JP2018/016351
§ 371 (c)(1),
(2) Date: Apr. 1, 2019

(87) PCT Pub. No.: WO2018/216413
PCT Pub. Date: Nov. 29, 2018

(65) Prior Publication Data
US 2020/0043105 A1    Feb. 6, 2020

(30) Foreign Application Priority Data
May 23, 2017  (JP) .................................. 2017-101931

(51) Int. Cl.
*G06Q 50/00*     (2012.01)
*H04W 4/029*    (2018.01)
(Continued)

(52) U.S. Cl.
CPC ......... *G06Q 50/01* (2013.01); *G06Q 30/0201* (2013.01); *G06Q 30/0261* (2013.01); *H04W 4/025* (2013.01); *H04W 4/029* (2018.02)

(58) Field of Classification Search
CPC .............. G06Q 50/01; G06Q 30/0261; G06Q 30/0201; H04W 4/029; H04W 4/025
(Continued)

(56) References Cited

U.S. PATENT DOCUMENTS 10,373,208 B2 * 8/2019 Kusukame ......... G06Q 30/0251

FOREIGN PATENT DOCUMENTS

| JP | 2013-30160 A | 2/2013 |
| JP | 2014-207526 A | 10/2014 |

OTHER PUBLICATIONS

English translation of the International Preliminary Report on Patentability and Written Opinion of the International Searching Authority dated Dec. 5, 2019 in PCT/JP2018/016351, 6 pages.
(Continued)

*Primary Examiner* — Amancio Gonzalez
(74) *Attorney, Agent, or Firm* — Oblon, McClelland, Maier & Neustadt, L.L.P.

(57) ABSTRACT

An aloneness estimation device estimating whether a user acts alone includes an operation state information acquisition unit configured to acquire operation state information indicating the user's operation state of a terminal per position, a criteria setting unit configured to set criteria for use in estimation in accordance with a position related to the acquired operation state information, an estimation unit configured to estimate whether the user acts alone from the operation state information acquired by the operation state information acquisition unit based on the set criteria, and an output unit configured to output information in accordance with estimation.

6 Claims, 8 Drawing Sheets

(51) Int. Cl.
*G06Q 30/02* (2012.01)
*H04W 4/02* (2018.01)

(58) Field of Classification Search
USPC ..................................................... 455/456.3
See application file for complete search history.

(56) References Cited

OTHER PUBLICATIONS

International Search Report issued on Jul. 10, 2018 in PCT/JP2018/016351 filed on Apr. 20, 2018.

* cited by examiner

*Fig.2*

| DATE | TIME | POSITION | SCREEN ON/OFF |
|---|---|---|---|
| 2016/12/24 | 00:01:15 | (35.25, 139.36) | ON |
| ... | ... | ... | OFF |
| 2016/12/24 | 23:55:20 | (35.20, 130.36) | ON |
| 2016/12/24 | 23:58:12 | (35.27, 193.18) | OFF |
| ... | ... | ... | ON |

*Fig.3*

| CATEGORY | PLACE OR FACILITY NAME | RATE OF SCREEN ON STATE ms |
|---|---|---|
| EATING ESTABLISHMENT | CAFE A | 0.5 |
| | ... | |
| THEME PARK | THEME PARK B | 0.2 |
| | ... | |
| ... | ... | ... |

| TIME | WEEKDAY OR HOLIDAY | PLACE OR FACILITY NAME | APPLICATION USE HISTORY |
|---|---|---|---|
| 8:00:00~ 9:00:00 | WEEKDAY | CAFE A | NEWSPAPER APPLICATION X |
| | | | GAME Y |
| ... | ... | ... | ... |

(a)

(b)

ALONENESS ESTIMATION DEVICE

TECHNICAL FIELD

The present invention relates to an aloneness estimation device estimating whether a user acts alone.

BACKGROUND ART

For example, as described in Patent Literature 1, a technique in which a state of a user is analyzed based on a user's operation history to a terminal has been conventionally proposed.

CITATION LIST

Patent Literature

Patent Literature 1: Japanese Unexamined Patent Publication No. 2013-30160

SUMMARY OF INVENTION

Technical Problem

In persons' daily lives, there are chances to interact with persons in various positions (coworkers, family members, friends with common interests, and the like), and each one interacts with such persons in various ways. Since whether or not a person interacts with others is related with his/her mental state, his/her mental state can be estimated by figuring out the degree of his/her interaction with others. A conceivable way to figure out the degree of his/her interaction with others is estimation of to what extent the user acts alone. It can be thought of that whether or not the user acts alone is estimated with use of the user's operation history to the terminal as in the above conventional technique. However, it is difficult to do accurate estimation merely by using the operation history.

The present invention is accomplished by taking such problems as mentioned above into consideration thereof, and an object thereof is to provide an aloneness estimation device enabling estimation of whether a user acts alone to be done accurately.

Solution to Problem

To achieve the above object, an aloneness estimation device according to an embodiment of the present invention is an aloneness estimation device estimating whether a user acts alone, and includes an operation state information acquisition unit configured to acquire operation state information indicating the user's operation state of a terminal per position, a criteria setting unit configured to set criteria for use in estimation in accordance with a position related to the operation state information acquired by the operation state information acquisition unit, an estimation unit configured to estimate whether the user acts alone from the operation state information acquired by the operation state information acquisition unit based on the criteria set by the criteria setting unit, and an output unit configured to output information in accordance with estimation by the estimation unit.

The user's operation state of the terminal normally corresponds to whether or not the user acts alone and also corresponds to the user's position. In the aloneness estimation device according to the embodiment of the present invention, based on the criteria set in accordance with the position, whether the user acts alone is estimated from the operation state information. Consequently, with the aloneness estimation device according to the embodiment of the present invention, estimation of whether the user acts alone can be done accurately.

Advantageous Effects of Invention

According to an embodiment of the present invention, since, based on criteria set in accordance with a position, whether a user acts alone is estimated from operation state information, estimation of whether the user acts alone can be done accurately.

BRIEF DESCRIPTION OF DRAWINGS

FIG. 2 illustrates an example of operation state information.

FIG. 3 illustrates information for setting a threshold value.

FIG. 6 illustrates a list of applications for use in estimation.

DESCRIPTION OF EMBODIMENTS

Hereinbelow, embodiments of an aloneness estimation device according to the present invention will be described in detail with reference to the drawings. It is to be noted that, in the description of the drawings, similar or identical components are shown with the same reference signs, and description of the duplicate components is omitted.

Figure 1:
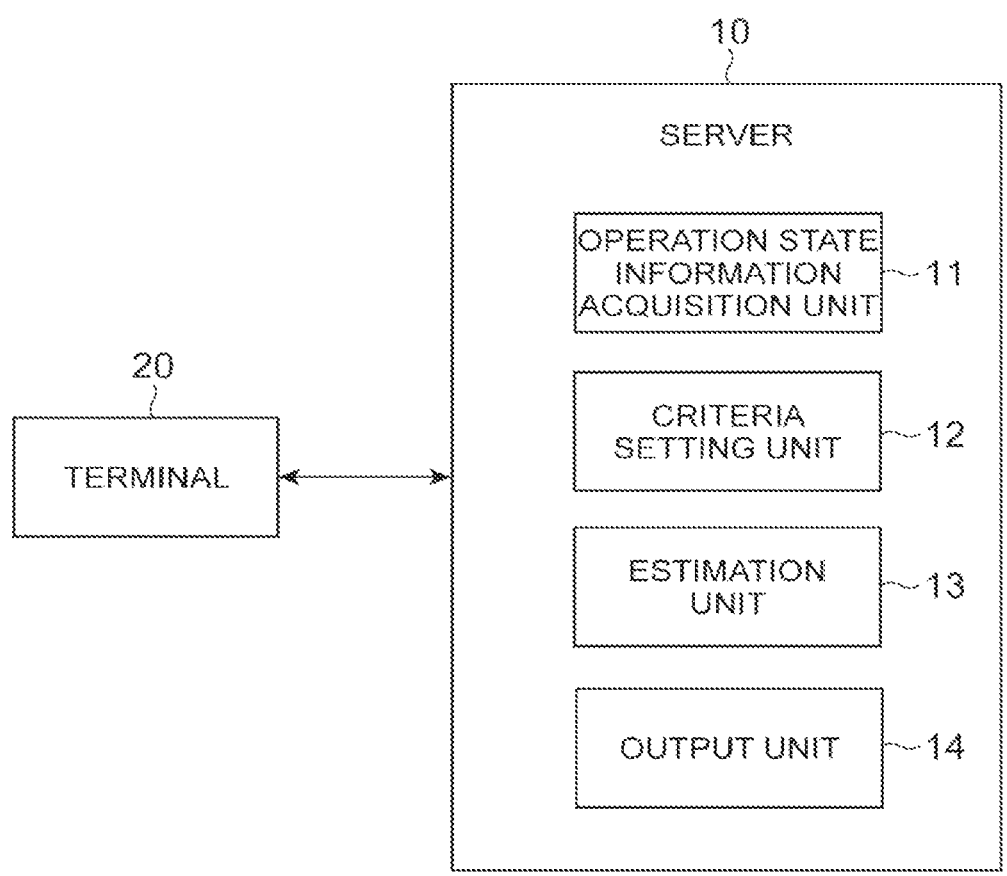
FIG. 1 illustrates a configuration of a server serving as an aloneness estimation device according to an embodiment of the present invention.

FIG. 1 illustrates a server 10 serving as an aloneness estimation device according to an embodiment. The server 10 is a device (system) estimating whether a user of a terminal 20 acts alone (is alone) The server 10 does estimation based on information transmitted from the terminal 20.

An estimation result provided by the server 10 can be used for estimation of a mental state of the user as described above, for example. Specifically, in a case in which the user is alone for a long time, that is, in a case in which the user rarely interacts with others, it can be estimated that the user's mental state is negative. The estimation result provided by the server 10 can also be used for control of timing for distribution of information to the user. Since the timing at which the user acts alone is timing at which distributed information is highly possibly seen by the user, the information is distributed to the user at this timing.

The terminal 20 is a device carried with and used by the user. Specifically, the terminal 20 corresponds to a mobile phone, a smartphone, or the like. The terminal 20 has a function of being connected to a network such as a mobile communication network and performing a wireless communication. The terminal 20 and the server 10 can communicate with each other via the network and can transmit and receive information to and from each other.

The terminal 20 acquires operation state information indicating the user's operation state of the user's own terminal 20. The terminal 20 also has a positioning function of the user's own terminal 20 such as a GPS (global positioning system) positioning function and acquires positional information indicating a position of the user's own terminal 20. The terminal 20 transmits each piece of information acquired to the server 10. Specific description of what kind of information is transmitted will be provided below. The information may be transmitted at preset time (for example, 0 o'clock) once per day, for example.

The terminal 20 includes hardware such as a CPU (Central Processing Unit), a memory, and a wireless communication module in a similar manner to that of a normal mobile phone, smartphone, or the like.

Next, functions of the server 10 according to the present embodiment will be described. As illustrated in FIG. 1, the server 10 includes an operation state information acquisition unit 11, a criteria setting unit 12, an estimation unit 13, and an output unit 14.

The operation state information acquisition unit 11 is a function unit acquiring operation state information indicating the user's operation state of the terminal 20 per position. The position is a geographical position (place) at which the user operates the terminal 20. The operation state information acquisition unit 11 receives and acquires the operation state information transmitted from the terminal 20.

The operation state information is information indicating an ON state or an OFF state of a (display) screen included in the terminal 20, for example. The terminal 20 includes the screen. Normally, when the terminal 20 is operated by the user, the terminal 20 turns ON (a state in which the screen is displayed) the screen. Also, when the terminal 20 is not operated by the user for a predetermined period, the terminal 20 turns OFF (a state in which the screen is not displayed) the screen. The ON or OFF state of the screen thus indicates the user's operation state.

An example of the operation state information acquired by the operation state information acquisition unit 11 is illustrated in FIG. 2. As illustrated in FIG. 2, the operation state information is information in which "Date," "Time," "Position," and "Screen ON/OFF" are made to correspond to each other. "Date" and "Time" are information indicating date and time of timing at which the screen in the terminal 20 is turned ON or OFF. "Position" is positional information indicating a position at which the screen in the terminal 20 is turned ON or OFF and is specifically latitude and longitude. "Screen ON/OFF" is information indicating whether the screen is turned ON or OFF. The ON indicates that the screen is turned ON, and the OFF indicates that the screen is turned OFF. It is to be noted that the operation state information may be information indicating the ON or the OFF of the screen at predetermined time intervals, not information provided each time the screen is turned ON or OFF.

As described above, the operation state information is time-series information and is equivalent to a user's operation history of the terminal 20. It is to be noted that, although the position information and the screen ON/OFF information are made to correspond to each other in the operation state information transmitted from the terminal 20 in the above example, the position information and the screen ON/OFF information may be acquired separately. In this case, the respective pieces of information at close times may be made to correspond to each other, for example. The operation state information acquisition unit 11 outputs the acquired operation state information to the criteria setting unit 12.

The criteria setting unit 12 is a function unit setting criteria for use in estimation in accordance with a position related to the operation state information acquired by the operation state information acquisition unit 11. The criteria setting unit 12 determines stay of the user and sets criteria for use in estimation at a position at which the criteria setting unit 12 has determined that the user stays. The criteria setting unit 12 sets a threshold value as the criteria. The criteria setting unit 12 sets the criteria in accordance with a type of the position.

Estimation by the server 10 is performed for a position at which the user stays (remains). The stay of the user means a state in which the user stays at a somewhat small area, that is, a state in which the user is located in a certain area continuously for a predetermined or longer period of time. Thus, estimation by the server 10 is performed in a case in which the user stays at a certain place or facility. A state in which the user moves, that is, a state in which the user does not stay at any place or facility, is not targeted for estimation.

Specifically, the criteria setting unit 12 specifies a place or facility targeted for estimation and sets criteria for use in estimation as in the following manner. The criteria setting unit 12 inputs the operation state information from the operation state information acquisition unit 11. The criteria setting unit 12 determines stay of the user based on the time-series position indicated by the operation state information. For example, in a case in which the time-series position indicated by the operation state information is in a preset size range for a preset or longer period of time, the criteria setting unit 12 determines that the user stays. Meanwhile, information previously set and stored in the server 10 and used for processing is previously input in the server 10 by an administrator or the like of the server 10 (the same is true for information described below).

Also, in a case in which the criteria setting unit 12 determines that the user stays, the criteria setting unit 12 specifies a place or facility at which the user stays. Specifically, the criteria setting unit 12 previously stores a position of each place or facility. The criteria setting unit 12 calculates a stay point per stay. For example, the criteria setting unit 12 calculates a stay point by averaging positions at which the criteria setting unit 12 has determined that the user stays. The criteria setting unit 12 specifies a place or facility located closest to the stay point as a place or facility at which the user stays. Meanwhile, determination of the stay and specification of the place or facility at which the user stays may be performed with use of a conventional technique such as a method described in Japanese Unexamined Patent Publication No. 2014-207526.

Also, the criteria setting unit 12 may determine stay by means of a method instead of the above method. For example, the criteria setting unit 12 receives information indicating a time-series moving state of the terminal 20 (speed or acceleration of the terminal 20, a position of the terminal 20, or the like) transmitted from the terminal 20 to estimate from the information whether or not the user moves. The estimation can be performed by means of a conventional art (for example, Activity Recognition provided by Google). The criteria setting unit 12 determines that the user stays at a time zone at which it is estimated that the user does not move.

The criteria setting unit 12 previously stores information illustrated in the table in FIG. 3 as information for setting a threshold value. As illustrated in FIG. 3, the information is one in which "Category," "Place or Facility Name," and "Rate of (Time of) Screen ON State $m_3$" are made to correspond to each other. "Category" is a kind of a place or facility such as an eating establishment and a theme park. "Place or Facility Name" is a name of a place or facility. Places or facilities are previously categorized as categories, and the category information is registered as a dictionary in the server 10. "Rate of Screen. ON state $m_3$" is a threshold value for use in estimation. "Rate of Screen ON state $m_3$" is a value for each category and corresponds to names of one or more places or facilities belonging to the category.

The criteria setting unit 12 sets a value of "Rate of Screen ON state $m_3$" corresponding to a name of a place or facility in the table in FIG. 3 at which the User stays as a threshold value for use in estimation. As described above, since "Rate of Screen ON state $m_3$" is a value for each category, the threshold value is a value corresponding to the kind of the place.

The criteria setting unit 12 outputs to the estimation unit 13 information determined as stay out of pieces of operation state information input from the operation state information acquisition unit 11 and a set threshold value.

The estimation unit 13 is a function unit estimating whether the user acts alone from the operation state information acquired by the operation state information acquisition unit 11 based on the criteria set by the criteria setting unit 12. The estimation unit 13 compares the period of time during which the user operates the terminal 20 indicated by the operation state information with the threshold value set by the criteria setting unit 12 to estimate whether the user acts alone.

A way of estimation in the present embodiment will be described. In general, it is thought of that a period of time during which the user uses the terminal decreases when the user interacts with others. Hence, in a case in which the terminal use time period is a threshold value or less, it is estimated that the user does not act alone, that is, the user visits the place or facility with a plurality of persons. Conversely, in a case in which the terminal use time period exceeds the threshold value, it is estimated that the user acts alone, that is, the user visits the place or facility alone.

The terminal use time period of the user corresponds to the place or facility that the user visits as well as whether the user interacts with others. For example, it is thought of that, in a case in which the user visits a theme park with others, the terminal use time period of the user is shorter than in a case in which the user visits a cafe with others. Hence, as described above, in the present embodiment, the threshold value corresponds to the place or facility that the user visits. The threshold value is lower as the place or facility (position) is one at which it is thought of that the terminal use time period of the user is shorter in a case in which the user visits the place or facility with others.

Specifically, the estimation unit 13 does estimation in the following manner. The estimation is performed per stay at a place or facility. The estimation unit 13 inputs from the criteria setting unit 12 each piece of operation state information determined as stay and each set threshold value $m_3$. The estimation unit 13 calculates from the input operation state information a rate of a screen ON state $m_1$ per stay point. The estimation unit 13 calculates a stay period of time during which the user stays at the place or facility from earliest time of the information determined as stay to latest time. The estimation unit 13 also calculates from the information determined as stay a period of time during which the screen is in an ON state. For example, in a case of the operation state information illustrated in FIG. 2, the period of time from the time at which the screen is turned ON to the time at which the screen is turned OFF is regarded as the period of time during which the screen is in the ON state. The estimation unit 13 calculates from the information determined as stay all periods of time during which the screen is in the ON state and derives the total sum thereof. The estimation unit 13 divides the total sum of the periods of time during which the screen is in the ON state by the stay period of time at the place or facility to calculate the rate of the screen ON state $m_1$. For example, in a case in which the user stays at Place A for one and a half hours, and in which the total sum of the periods of the screen ON state is forty five minutes, the rate of the screen ON state $m_1$ is 0.5.

Meanwhile, the screen of the terminal 20 is sometimes turned ON without the operation by the user. For example, in a case in which the terminal 20 receives a mail, the screen of the terminal 20 is turned ON without the operation by the user. The period of time of the ON state brought about without the operation by the user may be excluded from the period of time of the ON state for use in calculation of the rate of the screen ON state $m_1$. For this reason, for example, in a case in which the screen is turned ON without the operation by the user, the ON state may not be included in the operation state information.

The estimation unit 13 compares the calculated rate of the screen ON state $m_1$ with the threshold value $m_3$ input from the criteria setting unit 12. In a case in which the calculated rate of the screen ON state $m_1$ is the threshold value $m_3$ or less ($m_1 \leq$ threshold value $m_3$), the estimation unit 13 estimates that the user does not act alone, that is, the user visits the place or facility with a plurality of persons. Conversely, in a case in which the calculated rate of the screen ON state $m_1$ exceeds the threshold value $m_3$ ($m_1 >$ threshold value $m_3$), the estimation unit 13 estimates that the user acts alone, that is, the user visits the place or facility alone. The estimation unit 13 outputs information indicating an estimation result to the output unit 14. Information indicating an estimation result is information about a name of a place or facility estimated to be visited, a stay period of time, and whether the user is alone at the place or facility, for example.

The output unit 14 is a function unit outputting information in accordance with estimation by the estimation unit 13. For example, the output unit 14 inputs information indicating an estimation result from the estimation unit 13 and transmits the information to a device using the estimation result such as a device estimating a user's mental state. It is to be noted that the output information is not limited to the information indicating the estimation result but may be any information as long as the information is one based on estimation by the estimation unit 13. Also, the output destination and the output method may be anything. The functions of the server 10 according to the present embodiment have been described above.

Figure 4:
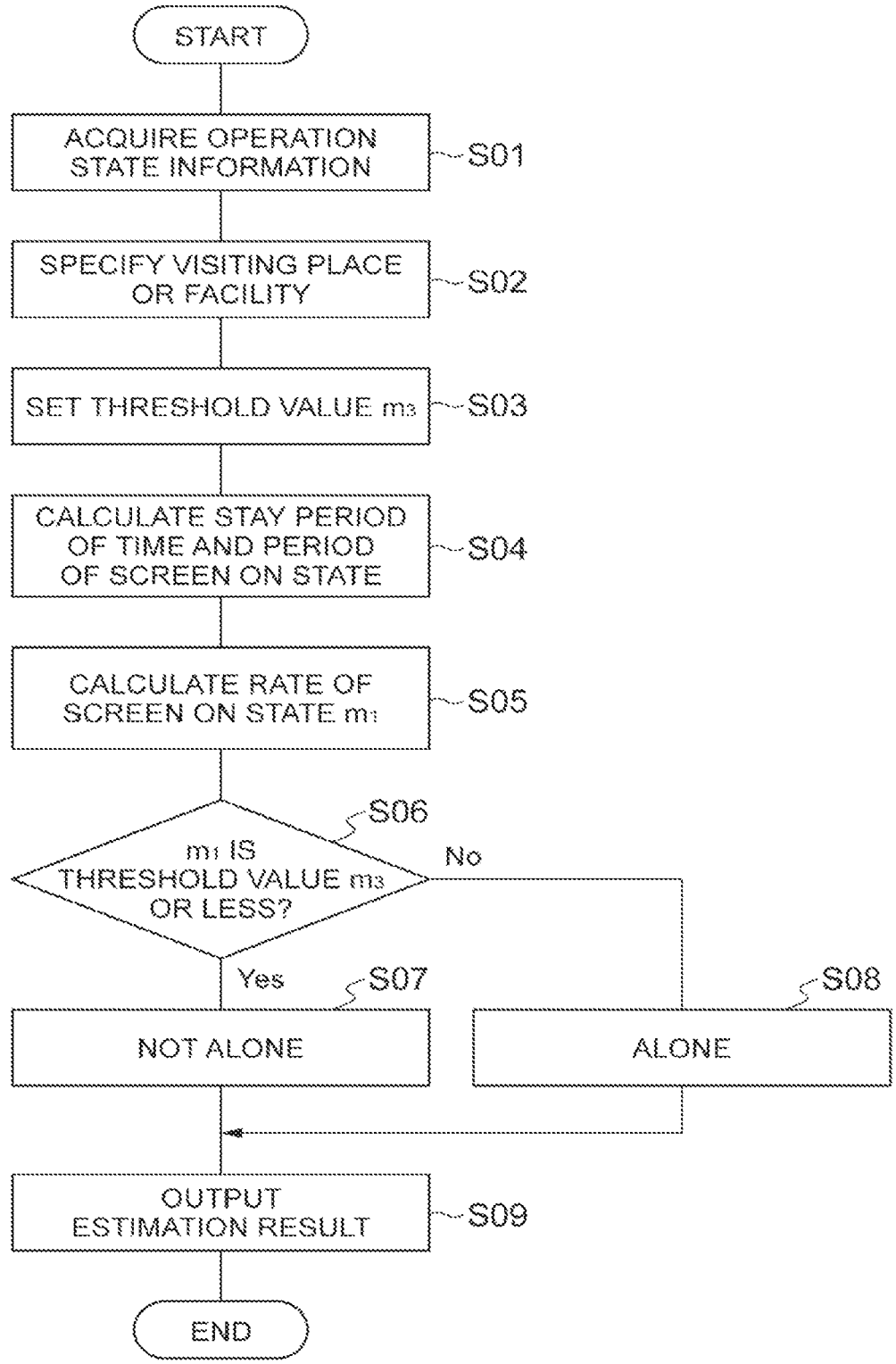
FIG. 4 is a flowchart illustrating processing executed in the server serving as the aloneness estimation device according to the embodiment of the present invention.

Next, processing executed in the server 10 according to the present embodiment (a method of an operation performed by the server 10) will be described with reference to the flowchart in FIG. 4. In this processing, operation state information transmitted from the terminal 20 is received and acquired by the operation state information acquisition unit 11 (S01). Subsequently, based on the operation state information, stay of the user is determined by the criteria setting unit 12, and a place or facility visited (stayed at) by the user is specified (S02). Subsequently, a threshold value $m_3$ is set per place or facility visited (stayed at) by the user by the criteria setting unit 12 (S03).

Subsequently, based on the operation state information, a stay period of time and a period of a screen ON state are calculated per place or facility visited (stayed at) by the user by the estimation unit 13 (S04). Subsequently, a rate of the screen ON state $m_1$ is calculated by the estimation unit 13 (S05). Subsequently, the rate $m_1$ and the threshold value $m_3$ are compared (S06).

In a case in which the rate $m_1$ is the threshold value $m_3$ or less (Yes in S06), the estimation unit 13 estimates that the user does not act alone (S07). Conversely, in a case in which the rate $m_1$ is not the threshold value $m_3$ or less (No in S06), the estimation unit 13 estimates that the user acts alone (S08).

When the above estimation (S07 or S08) is provided, the output unit 14 outputs information indicating an estimation result (S09). The processing executed by the server 10 according to the present embodiment has been described above.

As described above, the user's operation state of the terminal 20 normally corresponds to whether or not the user acts alone and also corresponds to the user's position. In the present embodiment, based on criteria set in accordance with a place or facility visited by the user, whether the user acts alone is estimated from operation state information. Accordingly, with the present embodiment, estimation of whether the user acts alone can be done accurately.

Also, in the present embodiment, a state of user's interaction with others can be estimated without monitoring the user by means of a camera, a microphone, or the like. Accordingly, with the present embodiment, the estimation can be done without causing a problem of privacy and a problem of consumption of a battery mounted on the device. Also, since the estimation can be done as long as any user carries the terminal 20, the estimation can be done without limiting users. Also, as described above, information may be distributed to the user when timing in accordance with an estimated result comes. Due to appropriate estimation, timing to distribute information to the user can be appropriate timing based on the estimation. Thus, the communication volume between the terminal and the server can be reduced, and processing load at the time of information distribution can be reduced. In other words, according to the present embodiment, network resources and hardware resources at the time of information distribution can be used efficiently.

It is to be noted that, in the present embodiment, although the screen ON/OFF information of the terminal 20 is used as the operation state information, the operation state information is not limited to this information and can be any information as long as the information indicates a user's operation state of the terminal 20.

Also, as in the present embodiment, stay of the user may be determined, and whether the user acts alone at a place or facility at which the user stays may then be estimated. According to this configuration, estimation can be done appropriately at the place or facility at which the user stays. However, in one embodiment of the present invention, whether the user acts alone may be estimated without determination of stay.

Also, as in the present embodiment, with criteria for use in estimation used as a threshold value, whether the user acts alone may be estimated based on a period of time during which the user operates the terminal 20. According to this embodiment, estimation can be done reliably and appropriately. However, estimation does not always need to be done in this manner, and estimation may be done based on arbitrary criteria set in accordance with operation state information and position.

Also, in the present embodiment, a threshold value may be set in accordance with a category of a place or facility, that is, a kind of a position. According to this configuration, a threshold value is not required to be previously stored for every position, and a threshold value can be set appropriately and easily. As a result, the embodiment of the present invention can be carried out appropriately and easily.

Next, modification examples of the present embodiment will be described. In the above embodiment, although a threshold value $m_3$ contained in the table illustrated in FIG. 3 corresponds to a category of a place or facility, the threshold value $m_3$ may correspond to a time zone as well as the category. For example, the criteria setting unit 12 may previously store a threshold value $m_3$ according to whether it is a weekday or a holiday and for every hour of a day, and determination may be provided with use of a threshold value $m_3$ corresponding to time at which the user stays at a place or facility (for example, time at which stay is started, the same is true of following cases in which the time zone is considered). For example, the threshold value $m_3$ is set to be (relatively) low for a time zone in which people highly possibly visit the facility alone while the threshold value $m_3$ is set to be (relatively) high for a time zone in which people scarcely visit the facility alone. In other words, the criteria setting unit 12 sets criteria for use in estimation based on time related to the operation state information as well. By setting the threshold value $m_3$ in this manner, estimation can be done further accurately.

Also, in the above embodiment, the threshold value $m_3$ contained in the table illustrated in FIG. 3 is previously input in the server 10 by an administrator or the like of the server 10. However, the server 10 may calculate the threshold value $m_3$ contained in the table illustrated in FIG. 3.

That is, the criteria setting unit 12 may acquire criteria determining operation state information of the user per position for use in determination of the criteria, determine criteria for each position from the acquired criteria determining operation state information, and set criteria for use in estimation from the determined criteria. Determination of the criteria is equivalent to calculation of the threshold value $m_3$ contained in the table illustrated in FIG. 3. Specifically, the criteria setting unit 12 calculates the threshold value in the following manner.

The criteria setting unit 12 acquires criteria determining operation state information of the user. The criteria determining operation state information is operation state information for use in calculation of the threshold value $m_3$ and is similar to the aforementioned operation state information. The criteria setting unit 12 acquires the criteria determining operation state information in a similar manner to that of the aforementioned operation state information. The criteria determining operation state information is preferably one based on the terminals 20 of a plurality of users. Also, the criteria determining operation state information for use in calculation of the threshold value $m_3$ is information acquired in a preset previous certain period (a half year, several months, or the like), for example.

The criteria setting unit 12 specifies a place or facility at which the user stays (remains) from the criteria determining operation state information. The criteria setting unit 12 calculates, as the threshold value $m_3$ for each category of the specified place or facility, a value for the rate of the screen ON state $m_3$ from the criteria determining operation state information for each category. The value for the rate of the screen ON state $m_3$ to be calculated may be derived by calculating values for the rates of the screen ON state of all users for respective stays and averaging the values or by dividing a total sum of values for the rates of the screen ON state of all users for respective stays by a total sum of stay periods of time for respective stays.

In a case in which the criteria determining operation state information of the plurality of users is acquired, it is probable that the users include users that act alone and users that do not act alone. Accordingly, the value for the rate $m_3$ calculated from the acquired criteria determining operation state information can be used as the threshold value. By using the threshold value calculated as above, appropriate estimation can be done.

Also, the operation state information acquisition unit 11 may acquire operation state information containing information indicating an application operated in the terminal 20 instead of or in addition to the aforementioned screen ON/OFF information. For example, the operation state information acquisition unit 11 acquires operation state information containing a history of an application on the terminal 20 that the user has used. The history of the application contains information of specifying the application that has been used, time at which the application is used, and a period of time during which the application is used.

In this case, the estimation unit 13 calculates a rate of a use period of a specific application per stay point to do estimation based on the use period. For example, the estimation unit 13 compares the rate of the use period of the specific application with a threshold value set by the criteria setting unit 12. The estimation unit 13 estimates that the user does not act alone in a case in which the rate of the use period is the threshold value or less and estimates that the user does not act alone in a case in which the rate of the use period is not the threshold value or less. Also, the estimation unit 13 may do estimation by combining the aforementioned rate of the screen ON state with the rate of the use period of the specific application. For example, the rate of the screen ON state and the rate of the use period of the specific application may be scored, and estimation may be done by comparing each of the scores with the threshold value set by the criteria setting unit 12.

The specific application in this case is an application that the user highly possibly tends to use alone, that is, an application that tends to be used when the user is alone. Examples thereof are an application letting movie contents viewed and an application of a one-person game. The estimation unit 13 previously stores a list of specific applications. The specific applications may be set by an administrator or the like of the server 10 or may be determined by the estimation unit 13.

For example, the estimation unit 13 determines the specific applications in the following manner. The estimation unit 13 acquires a description of the application from a site for downloading the application. The estimation unit 13 determines whether the application is a specific application based on keywords preset in the description. For example, in a case in which the description has keywords indicating that the application is highly possibly used alone (keywords such as "game" and "RPG"), the estimation unit 13 determines the application as a specific application. On the other hand, in a case in which the description has keywords indicating that the application is scarcely used alone (keywords such as "interpersonal," "one Smartphone," and "with others"), the estimation unit 13 excludes the application from specific applications.

Also, the estimation unit 13 may determine a specific application from operation state information. In this case, the estimation unit 13 acquires application specifying operation state information, which is operation state information containing the screen ON/OFF information and the application history, to determine the specific application. The application specifying operation state information is information about the terminal 20 of the user targeted for estimation of whether the user acts alone. Also, the application specifying operation state information is information acquired in a preset previous certain period (one month, a half year, or the like), for example.

Figure 5:
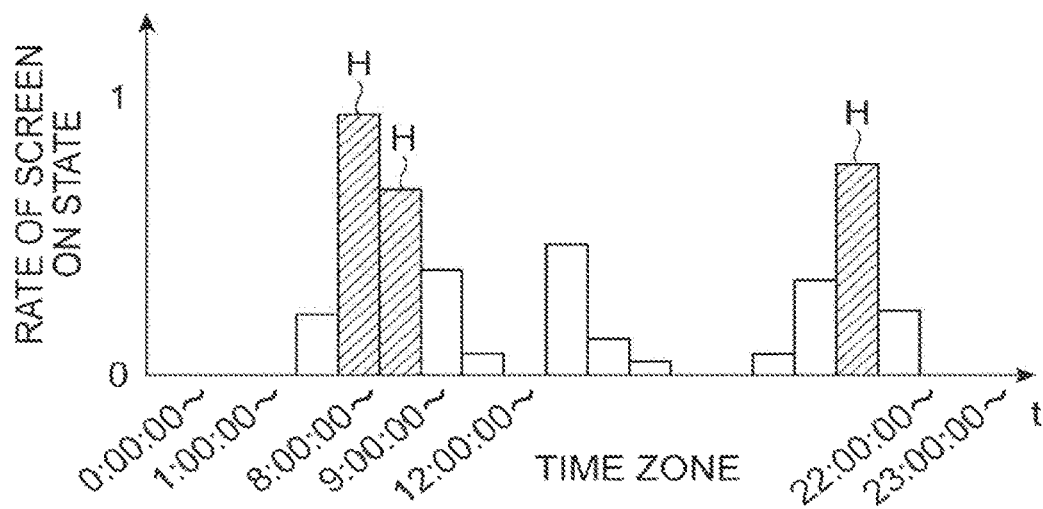
FIG. 5 is graphs of a rate of a screen ON state per time zone.
Figure 5:
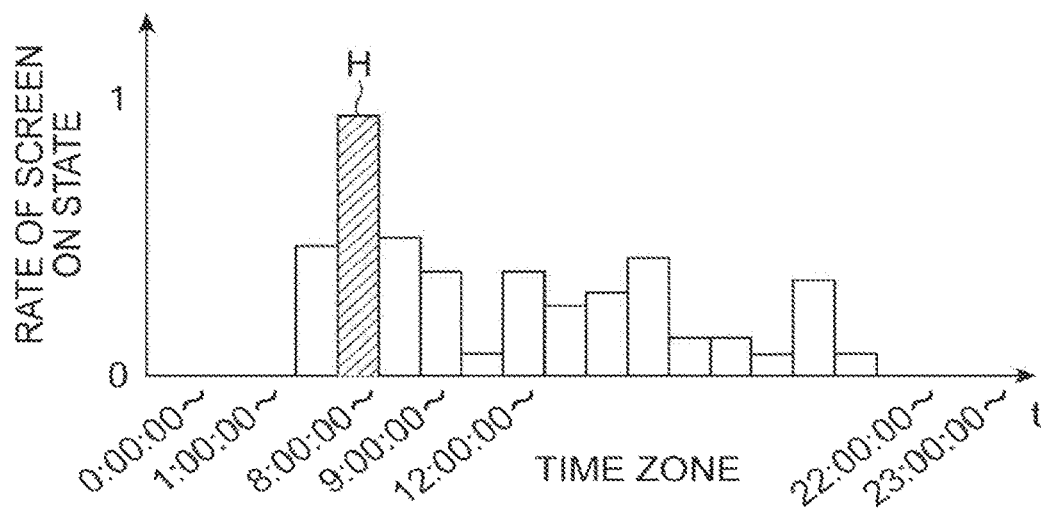

The estimation unit 13 calculates an average of the rates of the screen ON state per place or facility and per time zone. The time zone is time according to whether it is a weekday or a holiday and for every hour of a day, for example. The average of the rates may be derived by calculating values for the rates of the screen ON state of the user for respective stays and averaging the values or by dividing a total sum of values for the rates of the screen ON state for respective stays by a total sum of stay periods of time for respective stays. FIG. 5(*a*) illustrates a graph of the rate of the screen ON state per time zone in a case in which a user visits Cafe A on a weekday, and FIG. 5(*b*) illustrates the graph in a case in which the user visits Cafe A on a holiday.

The estimation unit 13 determines as a specific application an application that the user uses in a time zone in which the rate of the screen ON state exceeds a preset threshold value (for example, 0.5) and registers the application in the list. For example, the estimation unit 13 determines as a specific application an application that the user uses in each of time zones H illustrated in FIG. 5 and registers the application in the list. Meanwhile, in this case, the estimation unit 13 may determine as a specific application an application that is used a certain number of times or more.

An example of the registered list is illustrated in FIG. 6. As illustrated in FIG. 6, the list is information in which "Time," "Weekday or Holiday," "Place or Facility Name," and "Application Use History" are made to correspond to each other. "Time" and "Weekday or Holiday" are a time zone determined as time of the specific applications (every hour of a day) and whether it is a weekday or a holiday, respectively. "Place or Facility Name" is a name of a place or facility at which the applications are used. "Application Use History" is information specifying applications determined as specific applications (for example, names of applications). The estimation unit 13 regards the applications shown in the application use history as specific applications and estimates whether the user acts alone. Also, the application information may be used only for estimation in the time zone and at the position shown in "Time," "Weekday or Holiday," and "Place or Facility Name" in FIG. 6.

As described above, estimation can be done with use of information of applications that the user uses on the terminal 20. Also, by using the application information and the rate of the screen ON state together, more accurate estimation can be done.

Figure 7:
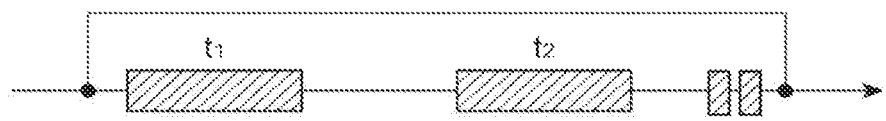
FIG. 7 is graphs each illustrating periods of time during which the screen of a terminal is in an ON state when a user stays at a certain place.
Figure 7:
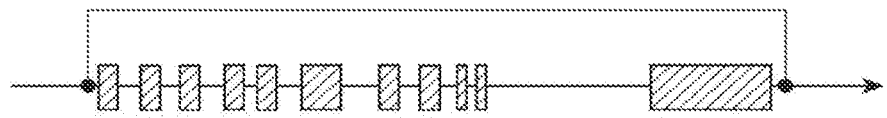

Also, the estimation unit 13 may estimate whether the user acts alone from a period of time during which the user continuously operates the terminal 20 indicated by the operation state information. FIG. 7 is graphs each illustrating periods of time during which the screen of the terminal 20 is in the ON state when the user stays at a certain place. For example, as illustrated in FIG. 7(*a*), it is probable that the continuous use period of the terminal 20 is longer in a case in which the user is alone than in a case in which the user is with a plurality of persons. For example, as illustrated in FIG. 7(*b*), it is probable that, in a case in which the user is not alone, the continuous use period of the terminal 20 decreases, and that the number of times of ON/OFF operations of the screen increases.

The estimation unit 13 derives a period of time $t_i$ during which the screen of the terminal 20 is continuously in the ON state as a period of time during which the user continuously operates the terminal 20 at the place or facility at which the user stays. In a case in which the period of time $t_i$ is a preset threshold value (for example, 10 minutes) or more, the estimation unit 13 derives a sum $T=\Sigma_j t_i$ ($t_i \geq 10$ minutes) of such periods. The estimation unit 13 calculates the rate of the screen ON state $m_1$ with use of the derived sum T and does estimation in the above manner.

As described above, by using the period of time during which the user continuously operates the terminal 20, estimation can be done more accurately.

The terminal 20 may include a part of the functions included in the server 10 in the present embodiment. That is, the terminal 20 may be included in an aloneness estimation device (system) according to an embodiment of the present invention. Also, the terminal 20 may include all of the functions included in the server 10 in the present embodiment. That is, the terminal 20 may be an aloneness estimation device according to an embodiment of the present invention.

The block diagram used to describe the above embodiment illustrates blocks for respective functions. Each of these functional blocks (components) fulfilled by arbitrary combination of hardware and/or software. Also, a means for fulfilling each of the functional blocks is not particularly limited. That is, each of the functional blocks may be fulfilled by one device coupled physically and/or logically, or two or more devices separated physically and/or logically may be connected directly and/or indirectly (for example, in a wired manner and/or in a wireless manner), and each of the functional blocks may be fulfilled by the plurality of devices.

Figure 8:
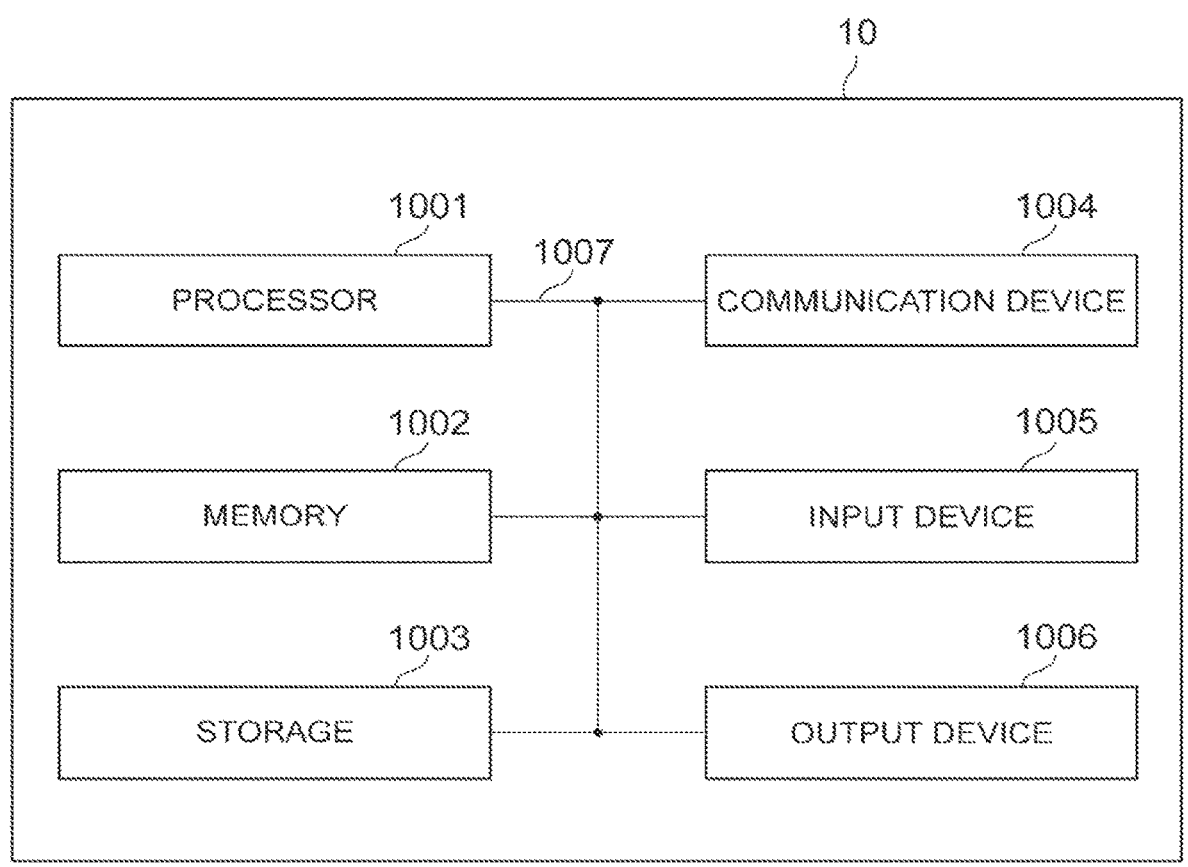
FIG. 8 illustrates a hardware configuration of the server serving as the aloneness estimation device according to the embodiment of the present invention.

For example, the server 10 according to an embodiment of the present invention may function as a computer performing processing of the server 10 according to the present embodiment. FIG. 8 illustrates an example of a hardware configuration of the server 10 according to the present embodiment. The aforementioned server 10 may physically be configured as a computer device including a processor 1001, a memory 1002, a storage 1003, a communication device 1004, an input device 1005, an output device 1006, a bus 1007, and the like.

In the following description, the term "device" can be substituted with a circuit, a device, a unit, or the like. In the hardware configuration of the server 10, the number of pieces of each device illustrated in FIG. 8 may be one or plural, and some of the devices may not be included.

Each of the functions in the server 10 is fulfilled by causing predetermined software (program) to be read into the hardware such as the processor 1001 and the memory 1002 to cause the processor 1001 to perform computing and to control a communication by means of the communication device 1004 and data reading and/or writing by means of the memory 1002 and the storage 1003.

The processor 1001 operates an operating system to control the entire computer, for example. The processor 1001 may be configured as a CPU (Central Processing Unit) including an interface with a peripheral device, a control device, a computing device, a register, and the like. For example, the respective functions of the server 10 may be fulfilled by the processor 1001.

The processor 1001 also reads a program (program code), a software module, and data from the storage 1003 and/or the communication device 1004 to the memory 1002 and executes various kinds of processing in accordance with these. As the program, a program causing the computer to execute at least part of the operations described in the above embodiment is used. For example, each of the functions of the server 10 may be fulfilled by a control program stored in the memory 1002 and operated by the processor 1001, and each of the other functional blocks may be fulfilled in a similar manner. Although, in the above description, various kinds of processing described above are executed by one processor 1001, these may be executed by two or more processors 1001 simultaneously or sequentially. The processor 1001 may be implemented on one or more chips. The program may be transmitted from a network via a telecommunication line.

The memory 1002 is a computer-readable recording medium and may be configured as at least one of memories such as a ROM (Read Only Memory), an EPROM (Erasable Programmable ROM), an EEPROM (Electrically Erasable Programmable ROM), and a RAM (Random Access Memory). The memory 1002 may be referred to as a register, a cache, a main memory (main storage device), or the like. The memory 1002 can store a program (program code), a software module, and the like executable to carry out a method according to an embodiment of the present invention.

The storage 1003 is a computer-readable recording medium and may be configured as at least one of storages such as an optical disc such as a CD-ROM (Compact Disc ROM), a hard disc drive, a flexible disc, a magneto-optical disc (such as a compact disc, a digital versatile disc, and a Blu-ray (registered trademark) disc), a smart card, a flash memory (such as a card, a stick, and a key drive), a floppy (registered trademark) disc, and a magnetic strip. The storage 1003 may be referred to as an auxiliary storage device. The aforementioned storage medium may be a database, a server, or another appropriate medium including the memory 1002 and/or the storage 1003, for example.

The communication device 1004 is hardware (transmission/reception device) configured to do communication between computers via a wired and/or wireless network and is referred to as a network device, a network controller, a network card, a communication module, or the like, for example. For example, each of the functions of the aforementioned server 10 may be fulfilled by the communication device 1004.

The input device 1005 is an input device receiving an input from an external device (for example, a keyboard, a mouse, a microphone, a switch, a button, or a sensor). The output device 1006 is an output device performing output to an external device (for example, a display, a loudspeaker, or an LED lamp). Meanwhile, the input device 1005 and the output device 1006 may be integrated (for example, a touch panel).

Also, the respective devices such as the processor 1001 and the memory 1002 are connected via the bus 1007 configured to transmit/receive information. The bus 1007 may be configured as a single bus or separate buses between the devices from each other.

Also, the server 10 may be configured to include hardware such as a microprocessor, a DSP (Digital Signal Processor), an ASIC (Application Specific Integrated Circuit, a PLD (Programmable Logic Device), and an FPGA (Field Programmable Gate Array), and the respective functional blocks may partially or entirely be fulfilled by the hardware. For example, the processor 1001 may be implemented on at least one of these pieces of hardware.

Although the present embodiment has been described above in detail, it is to be understood by those skilled in the art that the present embodiment is not limited to the embodiments described in the present description. The present embodiment can be modified or altered without departing from the spirit and the scope of the present invention defined by the claims. Hence, the present description is intended for illustration and does not impose any limitations on the present embodiment.

Information notification may be performed not only in the methods described in the modes and embodiments in the present description but also in another method. For example, information notification may be performed with use of physical layer signaling (for example, DCI (Downlink Control Information) and UCI (Uplink Control Information)), upper layer signaling (for example, RRC (Radio Resource Control) signaling, MAC (Medium Access Control) signaling, and notification information (MIB (Master Information Block) and SIB (System Information Block))), another signal, or combination thereof. Also, the RRC signaling may be referred to as an RRC message and may be an RRC Connection Setup message or an RRC Connection Reconfiguration message, for example.

Each of the modes and embodiments described in the present description may be applied to a system using LTE (Long Term Evolution), LIE-A (LTE-Advanced), SUPER 3G, IMT-Advanced, 4G 5G, FRA (Future Radio Access), W-CDMA (registered trademark), GSM (registered trademark), CDMA2000, LIMB (Ultra Mobile Broadband), IEEE 802.11 (Wi-Fi), IEEE 802.16 (WiMAX), IEEE 802.20, UWB (Ultra-WideBand), Bluetooth (registered trademark), or another appropriate system and/or a next-generation system extended based thereon.

The order of the processing procedure, sequence, flowchart, or the like in each of the modes and embodiments described in the present description may be switched unless there is inconsistency. For example, although, in the method described in the present description, various step elements are provided in an illustrative order, the order is not limited to the specific order provided herein.

Information or the like that is input/output may be stored in a specific place (for example, the memory) or may be managed on a management table. Information or the like that is input/output can be overwritten, updated, or additionally recorded. Information or the like that is output may be deleted. Information or the like that is input may be transmitted to another device.

Determination may be performed by a one-bit number (0 or 1), a true or false value (Boolean: true or false), or comparison of values (for example, comparison with a predetermined value).

The respective modes and embodiments described in the present description may be used singly or in combination or may be switched in accordance with execution. Also, notification of predetermined information (for example, notification of "shall be X") may be done explicitly or implicitly (for example, notification of predetermined information is not done).

Software shall be interpreted broadly to mean a command, a command set, code, a code segment, program code, a program, a sub-program, a software module, an application, a software application, a software package, a routine, a sub-routine, an object, an executable file, an execution thread, a procedure, a function, or the like, regardless of whether the software is referred as software, firmware, middleware, microcode, a hardware description language, or another name.

Also, the software, the command, and the like may be transmitted/received via a transmission medium. For example, in a case in which the software is transmitted from a website, a server, or another remote source with use of a wired technique such as a coaxial cable, an optical fiber cable, a twisted-pair cable, and a digital subscriber line (DSL) and/or a wireless technique such as infrared light, radio waves, and microwaves, these wired and/or wireless techniques are included in the definition of the transmission medium.

The information, the signal, and the like described in the present description may be expressed with use of some of various different techniques. For example, data, an instruction, a command, information, a signal, a bit, a symbol, a chip, and the like that may be referred to over the above entire description may be expressed by voltage, current, electromagnetic waves, a magnetic field or magnetic particles, an optical field or photons, or arbitrary combination thereof.

Meanwhile, each term described in the present description and/or each term required for understanding of the present description may be substituted with a term having the same or similar meaning. For example, "channel" and/or "symbol" may be "signal." Also, "signal" may be "message." Also, "component carrier (CC)" may be referred to as "carrier frequency," "cell," or the like.

The terms "system" and "network" used in the present description are used in a compatible manner.

Also, the information, each of the parameters, or the like described in the present description may be expressed as an absolute value, a relative value to a predetermined value, or separate corresponding information. For example, the wireless resource may be indicated by an index.

The name used for each of the aforementioned parameters has no limited meaning in any respect. In addition, the equation or the like using such parameters may differ from one explicitly disclosed in the present description. Since each of various channels (for example, PUCCH and PDCCH) and information elements (for example, TPC) can be identified by any appropriate name, each of the various names corresponding to each of the various channels and information elements has no limited meaning in any respect.

The mobile communication terminal may be referred to by those skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or another appropriate term.

The term "determining" used in the present description may include various operations. "Determining" may include calculating, computing, processing, deriving, investigating, looking up (for example, looking up in a table, a database, or another data structure), and ascertaining in a case in which each of these operations is regarded as determining. "Determining" may also include receiving (for example, receiving information), transmitting (for example, transmitting information), input, output, and accessing (for example, accessing data in a memory) in a case in which each of these operations is regarded as determining. "Determining" may further include resolving, selecting, choosing, establishing, and comparing in a case in which each of these operations is regarded as determining. That is, "determining" may include some operation regarded as determining.

Each of the terms "connected" and "coupled," or any modified form thereof, means any direct or indirect connection or coupling between two or more elements and can include connection or coupling in which one or more intermediate elements exist between the two connected or coupled elements. The connection or coupling between elements may be physical, logical, or combination thereof. In a case in which "connection" or "coupling" is used in the present description, it can be stated that two elements are "connected" or "coupled" with use of one or more electric wires, cables, and/or printed electric connectors or, as several non-limiting and non-comprehensive examples, with use of electromagnetic energy such as one having a wavelength in a radio frequency range, a microwave range, or a (visible or invisible) optical range The phrase "based on" used in the present description does not mean "based only on" unless otherwise stated. In other words, the phrase "based on" means both "based only on" and "based at least on."

In a case in which elements are named "first," "second," and the like in the present description, any reference to these elements does not limit the amount or the order of the elements in an overall manner. These names can be used in the present description as a convenient way to distinguish two or more elements from each other. Hence, reference to the first and second elements does not mean that only the two elements can be employed or that the first element must precede the second element in some form.

Each of the terms "include" and "including," or any modified form thereof, is intended to be comprehensive as well as the term "comprising" as long as each of the terms is used in the present description or claims. Also, the term "or" used in the present description or claims is not intended to be an exclusive OR.

In the present description, a device shall include a plurality of devices except that it is contextually or technically apparent that there exists only one device. In the present overall disclosure, a thing shall include a plurality of things unless it is contextually apparent that the thing is singular.

REFERENCE SIGNS LIST 10 server
11 operation state information acquisition unit
12 criteria setting unit
13 estimation unit
14 output unit
1001 processor
1002 memory
1003 storage
1004 communication device
1005 input device
1006 output device
1007 bus
20 terminal

The invention claimed is:

1. An aloneness estimation device estimating whether a user acts alone, comprising:
   circuitry configured to
     acquire operation state information indicating the user's operation state of a terminal, carried with the user, per position;
     set criteria for use in estimation in accordance with a position related to the operation state information;
     estimate whether the user acts alone from the operation state information based on the criteria; and
     output information in accordance with estimation,
   wherein the circuitry is configured to set a threshold value as the criteria, and
   the circuitry is configured to compare a period of time during which the user operates the terminal indicated by the operation state information with the threshold value to estimate whether the user acts alone.

2. The aloneness estimation device according to claim 1, wherein the circuitry is configured to determine a stay state of the user, which is a state in which the user is located in a certain area continuously for a predetermined or longer period of time, and sets criteria for use in estimation at a position at which the circuitry has determined that the user stays.

3. The aloneness estimation device according to claim 1, wherein the circuitry is configured to set the criteria in accordance with a type of the position.

4. The aloneness estimation device according to claim 1, wherein the circuitry is configured to estimate whether the user acts alone from a period of time during which the user continuously operates the terminal indicated by the operation state information.

5. An aloneness estimation device estimating whether a user acts alone, comprising:
   circuitry configured to
     acquire operation state information indicating the user's operation state of a terminal, carried with the user, per position,
     set criteria for use in estimation in accordance with a position related to the operation state information;
     estimate whether the user acts alone from the operation state information based on the criteria; and
     output information in accordance with estimation,
   wherein the circuitry is configured to acquire criteria determining operation state information indicating an operation state of the user per position for use in determination of the criteria, determine criteria for each position from the acquired criteria determining operation state information, and set criteria for use in estimation from the determined criteria.

6. An aloneness estimation device estimating whether a user acts alone, comprising:
   circuitry configured to
     acquire operation state information indicating the user's operation state of a terminal, carried with the user, per position;
     set criteria for use in estimation in accordance with a position related to the operation state information;
     estimate whether the user acts alone from the operation state information based on the criteria; and
     output information in accordance with estimation,
   wherein the circuitry is configured to acquire the operation state information containing information indicating an application operated on the terminal.

* * * * *